United States Patent Office 3,522,094
Patented July 28, 1970

3,522,094
ELECTRODE INCLUDING HYDROPHOBIC POLYMER, METHOD OF PREPARATION AND FUEL CELL THEREWITH
Peter D. Richman, Park Ridge, N.J., assignor, by mesne assignments, to Leesona Corporation, Cranston, R.I., a corporation of Massachusetts
No Drawing. Filed Sept. 30, 1965, Ser. No. 491,871
Int. Cl. B32b 15/00; C23b 5/50; H01m 13/06
U.S. Cl. 136—86                                         11 Claims This invention relates to a novel process for the construction of electrodes for use in electrochemical device such as a fuel cell and to the electrodes made by the novel process. More particularly, the invention embraces a process for the construction of low thickness, lightweight electrodes having low internal electrical resistance, with the electrodes comprising a minimum amount of expensive electrochemically active metal. Essentially, the process comprises constructing electrodes by applying an admixture of a base metal and a hydrophobic polymer uniformly to a metal support. Thereafter, a surface layer of the base metal is replaced with a more noble, electrochemically active material. For convenience hereinafter, the process for preparing electrodes will be described with emphasis being placed on the use of the electrodes in a fuel cell. However, as will be apparent, the electrodes of the process can be employed in other electrochemical devices where similar considerations apply.

In the art, the advantages of lightweight electrodes for use in fuel cells have been recognized. These electrodes comprise a porous metal support coated with a catalytic material, such as a dispersion of noble metal black and hydrophobic polymer. Being extremely thin, the electrodes have low internal electrical resistance and, furthermore, take up only a very small amount of space, permitting the construction of highly compact cells having a high energy to volume and energy to weight ratio. However, it has been found that in order to obtain the necessary catalytic activity at low temperatures, noble metals such as platinum, palladium, osmium, and ruthenium must be employed. The use of such metals makes the electrode prohibitively expensive for many applications.

Accordingly, it is an object of the present invention to provide an improved process for the construction of thin, lightweight electrodes wherein the amount of precious or noble metal employed is minute.

It is another object of this invention to provide improved electrodes having high electrochemical activity at low temperatures, containing only minor amounts of precious or noble metal.

These and other objects of the invention will be more readily apparent from the following detailed description, with particular emphasis being placed on the working examples.

The aforesaid objects of the invention are accomplished by applying an admixture of a base metal and hydrophobic polymer to both major surfaces of a porous metal support. After applying the aforesaid admixture to the support, the surface area of the base metal is selectively replaced with a more precious metal, preferably a metal from Group VIII of the Mendelyeev's Periodic Table. The replacement is accomplished by numerous techniques including:

(1) Replacing the surface atoms of the base metal with atoms of the more noble metal electrolytically;
(2) Amalgamating the base metal with mercury and, thereafter replacing the mercury with a noble metal such as platinum;
(3) Providing a multi-component or multi-phase alloy of base metal particles and selectively corroding the various components and/or phases; and either coincidental to, or after the corroding, replace the metal with a noble metal as, for example, by electrodeposition; and
(4) Impregnating the base metal with hydrogen and, thereafter, replacing the hydrogen on the base metal with a noble metal by electrolytic processes.

The resultant electrodes are extremely thin, light in weight, and possess a high degree of mechanical integrity after extended periods of operation in a fuel cell. More critically, however, the electrodes made according to the present invention employ only minute amounts of the noble metal in comparison with conventional methods of preparation.

According to the present invention, the metal support can be a metal screen, expanded metal, metal felt, or mesh. It is essential that the structure be electronically conductive and able to withstand the corrosive environment of a fuel cell. Suitable metal supports which are preferably from 0.1 to 2 millimeters thick, with the mesh size being from 20 to 400, are composed of nickel, copper, iron, tantalum, zinc, gold, silver, and alloys thereof. Primarily from a standpoint of their exceptional resistance to the corrosive environments of the cell and their relative inexpensiveness, nickel and tantalum supports are preferred.

The base metal which is to be applied to the metal support as a dispersion with the hydrophobic polymer can be virtually any material which is lower in the electromotive series than the more noble metal which is to be the ultimate catalyst in the electrode. Such metals include columbium, tantalum, zirconium, titanium, thorium, vanadium, nickel, iron, zinc, copper, aluminum, gold, and the like. The catalytic metal which is to be the ultimate catalyst in the electrode are preferably the Group VIII metals of the Mendelyeev's Periodic Table because of their exceptional properties in catalyzing an electrochemical reaction. However, other metals may be selected.

The polymer which is dispersed with the base metal which is applied to the metal support must be relatively hydrophobic. Exemplary polymers include polystyrene, polyethylene, polytrifluoroethylene, polytetrafluoroethylene, polyvinylfluoride, polyvinylidenefluoride, polytrifluorochloroethylene, and co-polymers thereof. However, because of its exceptional hydrophobicity, as well as its resistance to heat and the corrosive environment of the electrolyte, polytetrafluoroethylene is preferred.

The admixture of base metal and polymer which is to be applied to the metal support screen can be formed employing numerous methods with it only being essential that the polymer be uniformly distributed throughout the ultimate catalytic layer. Thus, the admixture can be applied to the metal support as a dispersion of the base metal and the hydrophobic polymer in a suitable medium such as water, or an organic solvent. After the catalytic metal and polymer particles are mixed in the water to obtain a uniform suspension, the water is removed sufficiently to give a doughlike mass which is applied to the metal support by brushing, pressing, or rolling. Alternatively, the base metal polymer layer can be applied to the support by spraying from an aqueous solution. Preferably, the coated support at this point is dried by contacting the structure with a flow of warm air and, thereafter, lightly pressing or rolling. Before replacing the base metal with the more noble metal, the structure is heated in a draft furnace at a temperature at least sufficient to bond the polymer particles. The ratio of polymer to base metal in the dispersion is not critical. Normally, the desideratum is to have as light a load of base metal as possible but with a high surface area exposed for electrochemical reaction. In this manner, the total weight of the electrode containing the noble metal is as light as possible. In the usual construction, the base metal-polymer admixture will contain from 90 to 55 percent metal and from 10 to 45 percent polymer on a weight basis. The optimum percentage is from about 65 to 80 percent metal and from 85 to 20 percent metal polymer on a weight basis.

After the structure is prepared as described above, the base metal is replaced at least partially as set forth hereinbefore. The techniques of the replacement are known in the art and to the extent that description is necessary it will be found in the specific examples hereof.

EXAMPLE 1

A suspension was prepared containing 15 weight percent polytetrafluoroethylene (PTFE), 85 weight percent colloidal aluminum and sufficient water to prevent flocculation. The suspension was applied to, and allowed to settle upon a piece of porous kraft paper which had previously been coated with PTFE by drawing a water-PTFE suspension through the paper under vacuum. After the suspension was uniformly applied to the paper substrate, the water was drawn off under vacuum and the total structure pressed at 2400 p.s.i. The resultant cake was pressed into a 100 mesh nickel screen having a wire diameter of 0.002 inch and a weight of 14.4 mg./cm.$^2$. The coated screen was then sintered at 650° F., bonding the PTFE. The electrode structure was then immersed into a one molar palladium chloride solution and the aluminum replaced. The reaction was allowed to proceed for approximately 10 minutes at room temperature. The structure was washed with distilled water and the remaining aluminum leached out with nitric acid.

The electrode so formed was tested in a fuel cell as the anode and fed with pure hydrogen at 25° C. The electrolyte was a 30 percent aqueous solution of potassium hydroxide. The cell provided current densities as follows:

| Cell voltage, mv. | Current density, ma./cm.$^2$ |
| --- | --- |
| 500 | 800 |
| 600 | 550 |
| 700 | 240 |
| 800 | 70 |

EXAMPLE 2

A 50 mesh tantalum screen having a wire diameter of 0.003 inch and a weight of 28.5 mg./cm.$^2$ was brushed on both surfaces with a dispersion of PTFE and finely divided gold to provide 5 mg./cm.$^2$ of gold and 2 mg./cm.$^2$ PTFE per side. The electrode was placed in an oven and dried in air at 85° C. for 30 minutes and thereafter lightly rolled. After rolling, the electrode was placed in a draft furnace and sintered in air at 250° C. for 40 minutes. Thereafter, the structure was immersed in mercury to form an amalgam of gold and mercury. The mercury was then replaced by immersing the structure in a one molar platinum chloride solution. The reaction was allowed to proceed for approximately 30 minutes at room temperature. The electrode was leached in nitric acid and washed with distilled water. The resultant electrode had platinum at its surface and contained a high surface area.

The electrode so formed was tested in a fuel cell as the anode and fed with pure hydrogen at 25° C. The electrolyte was 5 normal sulfuric acid. The cell provided current densities as follows:

| Cell voltage, mv. | Current density, ma./cm.$^2$ |
| --- | --- |
| 700 | 665 |
| 600 | 690 |
| 500 | 730 |
| 300 | 740 |
| 200 | 800 |

EXAMPLE 3

A 100 mesh nickel screen with a wire diameter of 0.002 inch and a weight of 14.4 mg./cm.$^2$ was sprayed with a small spray gun on both sides with an aqueous dispersion of PTFE and finely divided columbium oxide sufficient to give 5 mg./cm.$^2$ of columbium oxide and 2 mg./cm.$^2$ of PTFE per side. The resultant electrode was placed in an oven and dried in air at 85° C. for 20 minutes. After drying, the electrode was rolled lightly and thereafter placed in a draft furnace and sintered at a temperature of 320° C. for 25 minutes. The resultant structure was cathodically charged with hydrogen by immersing in a 5 percent aqueous sodium hydroxide bath. Platinum anodes were inserted in the potassium hydroxide bath and current applied from a battery source. The structure was kept in the aqueous potassium hydroxide bath for 5 minutes at which time a curtain of bubbles appeared on the face of the structure. The structure is removed from the electrolyte bath and rinsed with distilled water before immersing in a 2 percent palladium chloride bath, and is kept in the bath for 6 minutes, depositing a film of palladium black on the structure. Approximately 4 milligrams of palladium are deposited per square centimeter of electrode surface. The structure is washed with distilled water to remove excess PdCl$_2$ solution.

The electrode so formed was tested in a fuel cell as the anode and fed with pure hydrogen at 25° C. The electrolyte was a 30 percent aqueous solution of potassium hydroxide. The cell provided current densities as follows:

| Cell voltage, mv. | Current density, ma./cm.$^2$ |
| --- | --- |
| 450 | 800 |
| 550 | 710 |
| 650 | 450 |
| 750 | 300 |

EXAMPLE 4

A 50 mesh tantalum screen having a wire diameter of 0.003 inch and a weight of 28.5 mg./cm.$^2$ was brushed with a dispersion of PTFE and a multi-component mixture comprising zinc, copper, and aluminum sufficient to provide 10 mg./cm.$^2$ of the base metals and 2 mg./cm.$^2$ of PTFE per side. The electrode was placed in an oven and dried in air at 85° C. for 30 minutes and thereafter lightly rolled. After rolling, the electrode was placed in a draft furnace and sintered at 300° C. for 35 minutes. After the sintering process, the electrode structure was immersed in a 28 percent solution of potassium hydroxide in order to selectively corrode or etch the components of the structure. The structure was maintained in the potassium hydroxide solution for 20 minutes at which time platinum anodes were inserted in the potassium hydroxide bath and current applied from a battery source. The electrode was maintained in the aqueous potassium bath for an additional five minutes at which time a curtain of bubbles appeared on the face of the structure. The structure was removed from the electrolyte bath and rinsed with distilled water and thereafter immersed in a 2 percent palladium chloride bath. The membrane was kept in the bath for 10 minutes depositing a film of palladium black on the membrane. The porous electrode had a high surface to volume ratio and, furthermore, contained only minor amounts of the noble metal.

The electrode so formed was tested in a fuel cell as the anode and fed with pure hydrogen at 25° C. The electrolyte was 5 normal sulfuric acid. The cell demonstrated excellent electrochemical properties.

In addition to the presently described process providing electrodes which contain only relatively minor amounts of the precious metal in comparison to those of the prior art, the primary catalyst, being applied after the major portion of the electrode is fabricated, is present in an exceedingly pure form. Additionally, the electrodes are highly reproducible. As is further apparent from the examples set forth above, it is possible to have numerous variations in the construction of the electrodes, depending upon the ultimate use of the structures.

The electrodes made by the novel process of the present invention can be employed in fuel cells using virtually any of the prior art electrolytes and, additionally, as the anode or cathode of the cell employing various fuels. By judiciously selecting the activating metal of the catalytic layer, the electrodes of the present invention can be tailored to be particularly suitable for any fuel such as hydrogen, the hydrocarbons, and ammonia. Additionally, metals such as silver and gold render the electrodes suitable for use as a cathode operated on air or oxygen as the oxidant. The electrodes being highly stable can be employed in fuel cells operated at high temperatures. However, one of the outstanding features of the present electrodes is their ability to provide reasonable current densities at a select voltage at low temperatures. Therefore, the preferred operating temperature is in the order of from about 25 to 150° C.

As will be apparent to one skilled in the art, the illustrative examples are set forth as preferred embodiments of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

It is claimed:

1. A method of constructing a lightweight electrode comprising the steps of applying a uniform coating onto and into a porous metal support, said coating comprising a uniform mixture of a base metal and a hydrophobic polymer, heating the coated support at a temperature elevated sufficiently to bond the hydrophobic polymer, and thereafter replacing substantially only the exposed surface area of the base metal with a more noble metal.

2. The method of claim 1 wherein the hydrophobic polymer is polytetrafluoroethylene.

3. The method of constructing a lightweight electrode comprising the steps of applying a uniform coating to a porous metal support, said coating comprising a uniform admixture of base metal and a hydrophobic polymer, heating the support at a temperature elevated sufficiently to sinter and bond the hydrophobic polymer, immersing said sintered structure in mercury to amalgamate said mercury and base metal at substantially only the exposed surface of the base metal, and thereafter replacing the amalgamate with a more noble metal.

4. The method of constructing a lightweight electrode comprising the steps of applying a uniform coating to a porous metal support, said coating comprising a uniform admixture of base metal and a hydrophobic polymer, heating the support at a temperature elevated sufficiently to sinter and bond the hydrophobic polymer, charging the structure with hydrogen sufficient to impregnate the base metal, immersing the structure in a salt solution of noble metal, and electrolytically coating the base metal with said noble metal.

5. The method of claim 4 wherein the base metal is columbium and the noble metal is platinum and the hydrophobic polymer is polytetrafluoroethylene.

6. The method of constructing a lightweight electrode comprising the steps of applying a uniform coating to a porous metal support, said coating comprising a uniform admixture of a multiple component base material and hydrophobic polymer, heating the coated support at a temperature elevated sufficiently to sinter and bond the hydrophobic polymer to form a unitary structure, and selectively corroding the surface area of said multiple component base material while simultaneously depositing a layer of a more noble metal onto the corroded surface of said structure.

7. A fuel cell for the direct generation of electrical energy from a fuel and oxidant comprising a fuel electrode, an oxidant electrode, an electrolyte between said electrodes, and means for supplying a fuel and oxidant to the respective electrodes, wherein at least one of said electrodes comprises an electrode prepared in accordance with the method of claim 10.

8. The fuel cell of claim 7 wherein the hydrophobic polymer is polytetrafluoroethylene.

9. A fuel cell of claim 7 in which the electrode includes a porous metal support.

10. A process for preparing an electrode comprising mixing a relatively base metal and a hydrophobic polymer; forming an electrode therefrom and replacing substantially only the exposed surface layer of said base metal with a more noble metal.

11. An electrode prepared in accordance with the method of claim 10.

References Cited

UNITED STATES PATENTS

| | | | |
|---|---|---|---|
| 3,110,622 | 11/1963 | Hipp | 136—120 XR |
| 3,110,631 | 11/1963 | Carlton | 136—86 |
| 3,171,757 | 3/1965 | Duddy | 204—38.2 XR |
| 3,248,267 | 4/1966 | Langer et al. | |
| 3,252,839 | 5/1966 | Langer et al. | 136—86 |
| 3,274,031 | 9/1966 | Maget et al. | 136—86 XR |
| 3,282,737 | 11/1966 | Hintermann et al. | 136—120 |

ALLEN B. CURTIS, Primary Examiner

U.S. Cl. X.R.

117—50, 130; 136—120; 204—29